United States Patent [19]

Lemonier

[11] Patent Number: 4,962,429

[45] Date of Patent: Oct. 9, 1990

[54] TELEVISION CAMERA HAVING AN INCREASED RESOLUTION IN A PORTION OF THE FIELD OF VIEW

[75] Inventor: Michel G. Lemonier, Vanves, France

[73] Assignee: U.S. Philips Corporation, New York, N.Y.

[21] Appl. No.: 297,823

[22] Filed: Jan. 13, 1989

[30] Foreign Application Priority Data

Jan. 19, 1988 [FR] France ................................ 88 00552

[51] Int. Cl.$^5$ .............................................. H04N 3/14
[52] U.S. Cl. .............................. 358/213.13; 358/209
[58] Field of Search ................... 358/225, 209, 213.13, 358/160; 355/52; 350/6.8

[56] References Cited

U.S. PATENT DOCUMENTS 4,467,361 8/1984 Ohno et al. ..................... 358/213.13
4,554,585 11/1985 Carlson et al. ...................... 358/209

Primary Examiner—Stephen Brinich

[57] ABSTRACT

Television camera for picking-up a scene and for producing a signal for an image therefrom, a portion of which has an increased resolution. At its input the camera is provided with a lens which produces an image of the scene on the input face of an anamorphic lens which distorts the image in accordance with a predetermined law in a given direction, the lens co-operating with a bidimensional charge-transfer pick-up device. This device detects the distorted image supplied, and includes an output shift register which is read by means of a clock whose rate is programmed as a function of the predetermined law so that the signal supplied by the charge-transfer device renders it possible to recover a final image which is no longer distorted, and which has a different resolution in different portions of the image. The image may be progressively or uniformly distorted into one direction in a certain portion of the image.

12 Claims, 6 Drawing Sheets

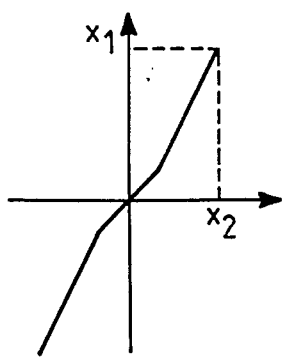
FIG. 2A
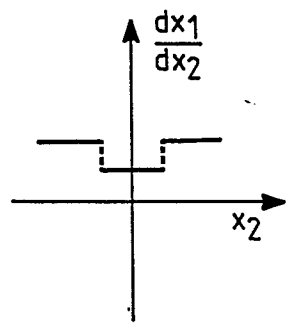
FIG. 2B
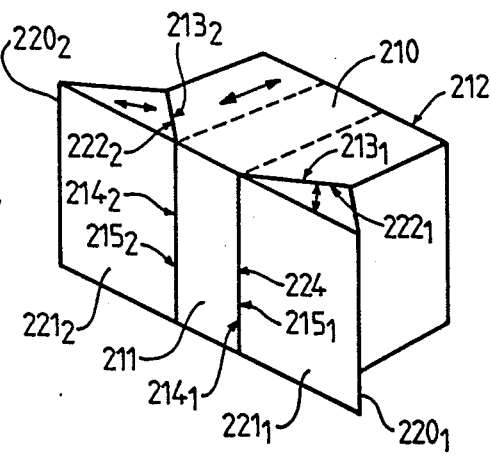
FIG. 2C
FIG. 2D

TELEVISION CAMERA HAVING AN INCREASED RESOLUTION IN A PORTION OF THE FIELD OF VIEW

BACKGROUND OF THE INVENTION

The invention relates to a television camera for picking-up a scene and for producing a signal for displaying an image therefrom, a portion of which has an increased resolution.

Such a camera is used in viewers or scene scanning devices which render it necessary to define with precision one portion of the image field, whilst tolerating a lower resolution in the surrounding field of vision.

An invention of this type is disclosed in the British Patent Specification No. 893,918 which discloses a closed-circuit television system by means of which it is possible to obtain from a scene an image having an increased resolution near a reticule. The television system includes a television camera and means rendering it possible for the scanning lines to be nearer to each other in the region containing the reticule. This region then has an increased resolution. The camera is constituted by a television tube for which scanning of the recording beam is such that there is an increased line density in the centre of the image. At the output of the camera the video signal corresponds to an image which is distorted. The image is corrected by the display tube which recovers a non-distorted image. The camera and the display tube must consequently be well-matched and be provided with two identical, non-standard scanning means. The display tube is therefore not of a universal type.

On the other hand, such a camera does not have an adequate reliability and geometrical stability, it requires high and stable analog control voltages. Its bulk is too large for many applications.

The technical problem to be solved is therefore to obtain a camera which does not have these disadvantages. It must have an increased resolution in a portion of the image so as to be matched to conventional display systems, must have a more extensive field of view and be of small dimensions for easy handling.

SUMMARY OF THE INVENTION

The input of the camera is provided with a lens which produces an image of the scene on an input face of an anamorphic lens which distorts the image in accordance with a predetermined law in a given. The lens cooperates with a charge-transfer pick-up device comprising means to electronically compensate for the distortion created by the anamorphic lens.

The object of the invention is to increase the resolution, preferably in the centre of the field of vision. This can be obtained by providing on both sides of the central zone, a wider field of vision but with a lower resolution. Actually, when a scene is observed by a viewer, he will centre his attention on an image portion which is of interest to him and will not pay so much attention to surrounding portions. The camera must therefore be able to supply the observer with an increased number of information components in this central portion, even to the detriment of lateral portions. Thus, the field of vision of the viewer will be split into two portions, a central portion where the spatial resolution is higher than that of a charge-transfer device (CTD) used in a conventional manner, and a remaining portion of the field of vision where the resolution will be less. It is possible to provide that the resolution becomes progressively less when one passes from the central portion to the lateral portions of the field of view. Obviously, this may both be a right-hand portion or a left-hand portion of the image and the other way around.

The anamorphic lens must deform the image into one single direction. It may produce an image which is progressively distorted into one direction in a predetermined portion of the image.

It can also produce an image which is uniformly distorted into one direction in a certain portion of the image.

To that end, it comprises a main fibre optics image conductor, having a non-flat input face, united via a portion of its input face with the overall extent of an output face of at least one appendant fibre optics image conductor in the form of a chamfer, the other portion of the input face of the main conductor and the input face of the appendant conductor being located in the image plane of the input lens, the axes of the optical fibres of the two conductors not being parallel to each other, the output face of the anamorphic lens being the output face of the main image conductor.

This output face is linked to the charge-transfer device either by direct coupling in such manner that the output face of the anamorphic lens is fixed on the pick-up device. It is equally possible for the image obtained on the output face of the anamorphic lens to be located in the object face of a coupling lens for coupling to the pick-up device.

The distorted image is detected by each element of the charge-transfer device and the collected charges are transferred to an output shift register. To that end, the charge-transfer device has an output shift register which is read by means of a clock whose rate is programmed as a function of a predetermined law, so that the signal supplied by the charge-transfer device renders it possible to recover a final image which is no longer distorted and has a different resolution in different portions of the image. This clock is obtained with the aid of a clock generator acting on an address counter, which has for its object to read a digital memory stroing data which control a programmable multivibrator which supplies the read clock according to said data relating to the predetermined law.

It is also possible for the output shift register of the charge-transfer device to be read by means of a clock having a uniform rate, the output data being transmitted via a transmission channel to two external line memories, one of which is written at a uniform rate whilst the other is read at a programmed rate, as a function of the predetermined law, each line memory being alternately switched to the read mode and to the write mode at each television line flyback pulse.

BRIEF DESCRIPTION OF THE DRAWINGS

FIGS. 2A, 2B, 2C and 2D show curves and two diagrams of an anamorphic lens which produces a uniform distortion into one direction in a portion of the image.

DETAILED DESCRIPTION OF THE PREFERRED EMBODIMENTS

Figure 1:
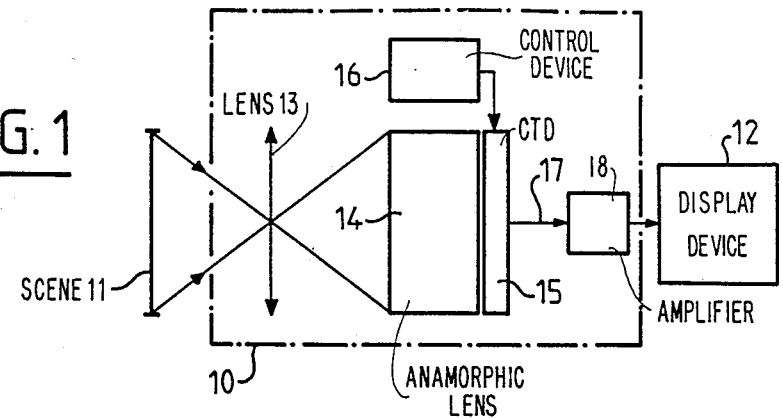
FIG. 1 is a circuit diagram of the camera according to the invention with its associated display device.

FIG. 1 shows a camera 10, a scene 11 and a display device 12. The camera 10 has an input lens 13 which produces an image on the input face of an anamorphic lens 14 which co-operates with a charge-transfer device (CTD) 15. This charge-transfer device receives control signals from a control device 16 which more specifically generates clock signals. The CTD 15 supplies a video signal via a line 17 which comprises an output amplifier 18 to form a video signal which is applied to the display device 12. In this Figure, the anamorphic lens 14 is fixed on the CTD 15. It is alternatively possible to separate these two elements and to interpose a coupling lens which focusses the output of the anamorphic lens 14 onto the CTD 15. Similarly, the input lens 13 is provided at the input of the camera; this lens 13 may be provided outside the camera 10.

Preferably, the anamorphic lens 14 decomposes the field of vision into a high-resolution central portion and lateral portions having a lower resolution. In this case the anamorphic lens 14 supplies an image which is uniformly distorted into one direction in a certain portion of the image. For that purpose FIG. 2D shows an anamorphic lens which supplies an image which is distorted in its boundary portions, the central portion not being modified. This anamorphic lens comprises:

a main fibre optics image conductor 210 whose optical fibres extend parallel to each other and in parallel with the optical axis of the anamorphic lens, the conductor being in the shape of a polygonal prism having a lateral input face 211 and a lateral output face 212 which extend substantially perpendicularly to the axis of the optical fibres, having at least one lateral face $213_1$, $213_2$ which is parallel to the lateral input face 211 and which intersects it in accordance with a main lateral line $214_1$, $214_2$, the adjacent lateral face $213_1$, $213_2$ being at an oblique angle with the axis of the optical fibres, and at least one appendant optical fibre image conductor $220_1$, $220_2$ in the form of a triangular prism, a lateral input face $221_1$, $221_2$ intersecting a lateral output face $222_1$, $222_2$ at an appendant lateral line $215_1$, $215_2$ forming a predetermined angle, the axes of the optical fibres being at an oblique angle with the optical axes, these axes being directed towards the axis of the anamorphic lens in the direction of propagation of the light rays, the lateral output face $222_1$, $222_2$ of the appendant conductor being fixed on the adjacent lateral face $213_1$, $213_2$ of the main conductor, said main lateral line $214_1$, $214_2$ and said appendant lateral line $215_1$, $215_2$ merging when the two image conductors are united.

An image formed on the input face will be conveyed via the optical fibres to the output face: the points $f_1$, $g_1$, $h_1$, $i_1$ will arrive at the respective points $f_2$, $g_2$, $h_2$ and $i_2$.

The central portion $g_1-h_1$ is shown without any distortion in $g_2-h_2$, in contrast thereto the image elements arriving between $h_1$ and $i_1$ and between $f_1$ and $g_1$ will be reduced by a certain factor in the lateral direction. This anamorphosis does in no way affect the vertical distribution of the image elements. The image formed on the output face appears intact in the central zone and compressed at the lateral zones but only along the horizontal axis. Thus, when the anamorphic lens is coupled to a charge-transfer pick-up device 15, for example a matrix of the CTD, a considerable portion of the image elements of the CTD will be dedicated for the central portion of the image. In the example illustrated by FIGS. 2C and 2D, the central portion $g_1-h_1$ which covers 20% of the horizontal field is represented in $g_2-h_2$ by 33% of the sensitive area of the image detector.

FIG. 2A shows the variation of the abscissa $x_1$ on the input face as a function of the abscissa $x_2$ on the output face. FIG. 2B shows the derivative $dx_1/dx_2$; it shows steps which are defined by the transition lines between the fibre optic blocks.

The two faces 211, 212 are positioned in the image and object plane, respectively, of an input and output lens, respectively. The expression "picture plane" may here be understood to mean a curved image face. The output lens is dispensed with when the CTD is directly fixed on the face 212. Preferably, these two faces 211, 212 are substantially parallel. In this case the direction of the optical fibres is substantially from the face 211 to the face 212 for the main conductor 210. For the appendant conductors $220_1$, $220_2$, the direction of the optical fibres is inclined relative to the input faces $221_1$ or $221_2$, respectively. This direction must intersect the respective output faces $222_1$ and $222_2$.

It is possible to use a single appendant conductor $220_1$ and to split the field of view into two left/right portions having different resolutions. In accordance with the preferential mode of the invention the field of view is decomposed into a high-resolution central portion and lateral portions having a lower resolution. Then two appendant image conductors $220_1$, $220_2$ are used, the angles the optical fibres enclose with the optical axes A A' of the system being equal and of opposite sign and converging towards the axis of the anamorphic lens in the direction of propagation of the light rays.

Figure 3A:
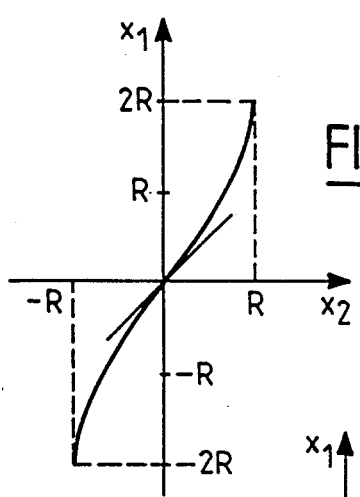
FIGS. 3A, 3B, 3C, 3D and 3E show curves and three diagrams of an anamorphic lens which produces a progressive distortion into one direction in a portion of the image.
Figure 3B:
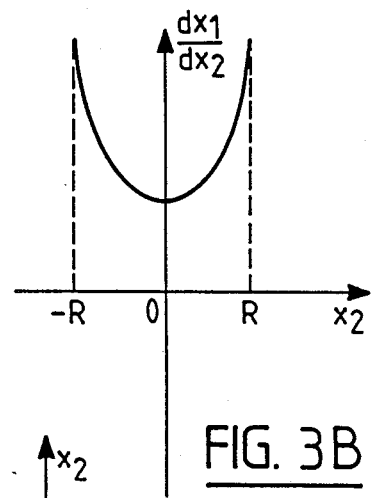
Figure 3E:
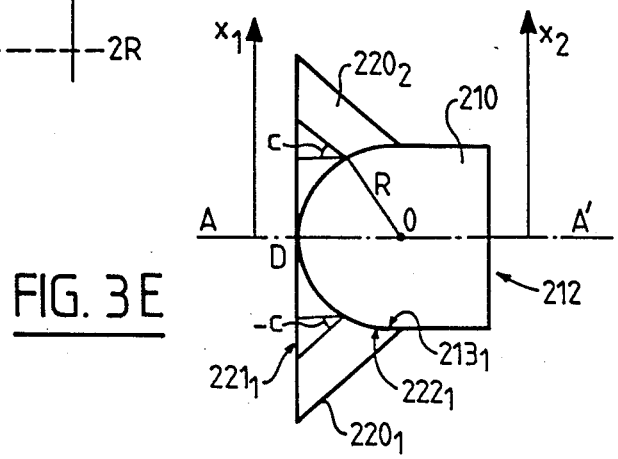
Figure 3C:
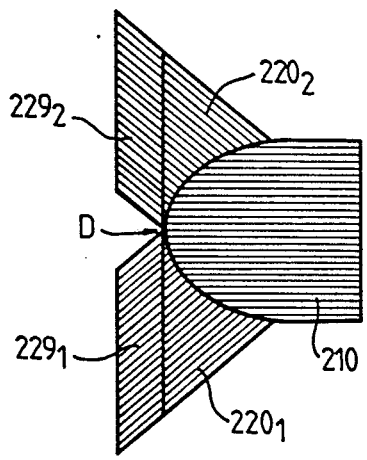
Figure 3D:
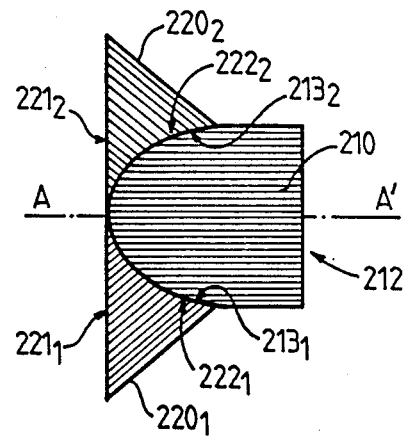

In accordance with a further embodiment shown in FIG. 3D, the anamorphic lens produces a progressively distorted image in one direction in a certain portion of the image.

FIG. 3D shows an anamorphic lens which produces a progressive distortion of the field of view. This anamorphic lens comprises:

a main fibre optics image conductor 210 in the form of a cylinder whose directrix has a first curved segment and at least a second segment, with a lateral face of the curved input, receiving the light rays, which is the face given by the generatrix of the cylinder which leans on the first curved segment of the directrix face, and a lateral output face 212 which is the face given by the generatrix of the cylinder which leans on the second segment of the directrix, the axes of the optical fibres being parallel to each other and parallel to the optical axis of the anamorphic lens, and at least one appendant fibre optics image conductor $220_1$, $220_2$ in the form of a cylinder having an input face $221_1$, $221_2$ and a curved lateral output face $222_1$, $222_2$, the axes of the optical fibres being at an oblique angle with the optical axis, these axes being directed towards the axis of the anamorphic lens in the direction of propagation of the light rays, the curved lateral output face $222_1$, $222_2$ of the appendant conductor being complementary and fixed on the curved lateral input face $213_1$, $213_2$ of the main conductor 210.

The reference numeralls used in the FIGS. 2C and 2D are also used in the FIGS. 3C and 3D to designate similar portions. In FIG. 3D the input face 211 of the main conductor of FIG. 2D has been omitted and the input face $221_1$ of the appendant conductor extends upto the optical axes A A' of the system. The contact faces $213_1$ and $222_1$, respectively, of the main conductor and of the appendant conductor are no longer flat but in this example are the lateral faces of a cylinder having a quarter of a circle for directrix curve.

In accordance with this embodiment, a continuous and progressive variation is obtained in the steps of the image elements along the horizontal axis (or vertical axis when the lens is rotated). The two lateral conductors $220_1$ and $220_2$ are shaped into a block (FIG. 3C) whose optical fibres are at respective angles $+c$ and $-c$ with the optical axis of the system (FIG. 3E). These conductors are lapped and polished to accurately mate with the curved linear profile of the main conductor 210. In the example shown in FIG. 3E, the conductor 210 is in the shape of a convex semi-cylinder having a radius R. For constructional purposes, the conductors $220_1$ and $220_2$ are given the shape of a concave cylinder having the same radius R, which is cemented to the conductor 210, is thereafter lapped and polished to such a degree that the input plane becomes tangent to the main conductor in the point D whilst omitting the portions $229_1$ and $229_2$ (FIG. 3C).

Using the above notations, the progressive and continuous anamorphic law is:

$$x_1 = x_2 + R \, tg \, c[1 - (1 - x_2^2/R^2)^{\frac{1}{2}}].$$

FIG. 3A shows for this example the variations of the abscissa $x_1$ on the input face as a function of the abscissa $x_2$ on the output face expressed with respect to the radius R. FIG. 3B shows the derivative $dx_1/dx_2$, it shows a continuous variation with a minimum.

It will be obvious that it is possible to use faces $213_1$ and $222_1$ of different shapes, for example by inverting the direction of the concavities, and to obtain different anamorphosis laws.

The image which is formed at the output of the anamorphic lens is detected by a CTD. This preferably is a bidimensional device arranged in lines and columns and receiving the distorted image so that the distortion is present in a direction which is substantially parallel to the line direction. CTD's of unidimensional structures may alternatively be used. When the CTD is bidimensional, the boundary separating in the image the distorted and non-distorted portions is arranged parallel to a column of the CTD to provide that this boundary is positioned in a predetermined location of the output shift register.

Referring to FIGS. 1 and 2C, the mechanisms can be analysed as follows. The central non-distorted portion is detected by the CTD with an image element density which is a function of the density of the detector elements of the CTD. In the lateral portions, the CTD having the same detection element density will detect a lower input image element density. Thus, one has more information components available in the centre of the image detected by the CTD. To ensure that the signal supplied by the CTD is compatible with the customary display device, the portion of the signal corresponding to the image centre must be read more rapidly. The read clock of the output shift register is consequently modified. To that end it has a shorter period to recover the data corresponding to the high-resolution portion than for the recovery of the data corresponding to the other portions.

Figure 4:
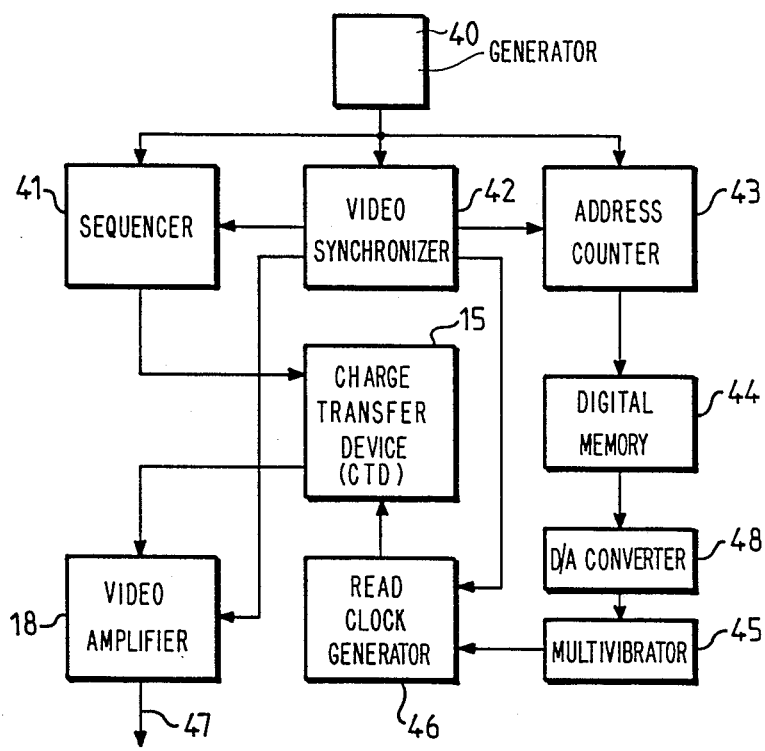
FIG. 4 is a circuit diagram of electronic means for reading the output register of the variable-rate charge-transfer device.

FIG. 4 shows a circuit diagram of electronic means for reading the output shift register of the CTD at a variable rate. A generator 40 supplies a primary clock which controls:
- a sequence 41 which produces the different service signals necessary for the CTD,
- a video synchronizer 42 which reduces the different synchronizing signals necessary for the ultimate display device,
- an address counter 43 which is re-initialized at each beginning of the video line rendering reading of the output register with a variable rate possible.

The address counter 43 has for its object to address a digital memory 44 which stores data which, with the aid of a digital-to-analog converter 48, control a programmable multivibrator 45 so as to submit its rate to the anamorphosis law determined by the anamorphic lens. A read clock generator 46 receives the output from the programmable multivibrator 45 as well as the synchronizing signals supplied by the synchronizer 42. The CTD 15 receives these different service signals from the sequencer 41 and a variable-rate read clock from the generator 46. The CTD 15 applies a video signal to the video amplifier 18 which the latter combines with the synchronizing signals produced by the synchronizing device 42 to supply a composite video signal from output 47.

Figures 5A, 5B:
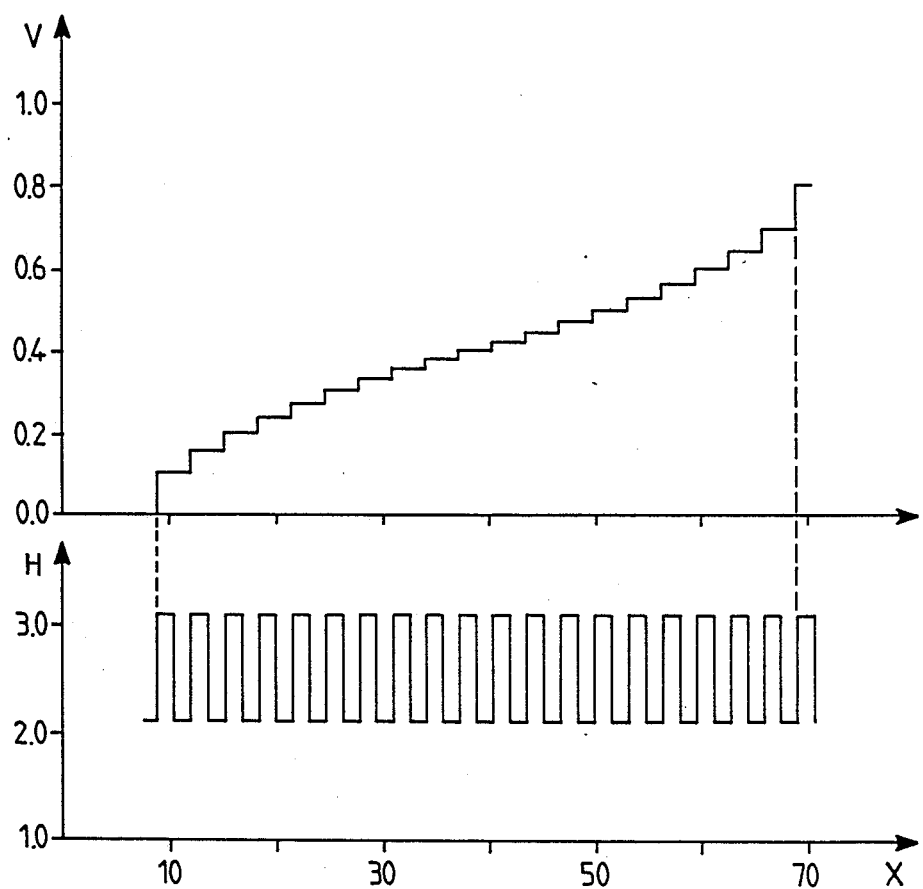
FIGS. 5A, 5B, 5C and 5D show time diagrams of the read clock.

Using an anamorphic lens of the type shown in FIG. 3D (the general case) the clock will continuously be variable during the duration of a line. The overall duration T of a data line being determined by the display device, it follows that the clock period will be shorter in the centre and longer at the ends than when the data would be read at a constant rate. On the basis of an image showing a variation from a black level to a white level, the video signal resulting therefrom will be formed by a rectilinear slope over the overall width of the image when it were read without any processing and in the absence of any anamorphic lens. Because of the provision of an anamorphic lens this slope appears to be no longer continuous if it is observed with a constant-rate read clock. This is shown in FIGS. 5A and 5B. FIG. 5B shows the output clock for the total duration of reading the width of the image. FIG. 5A shows the variations of the video signal read at a constant rate. The slope is formed from steps which are defined by a rectilinear shape.

Figures 5C, 5D:
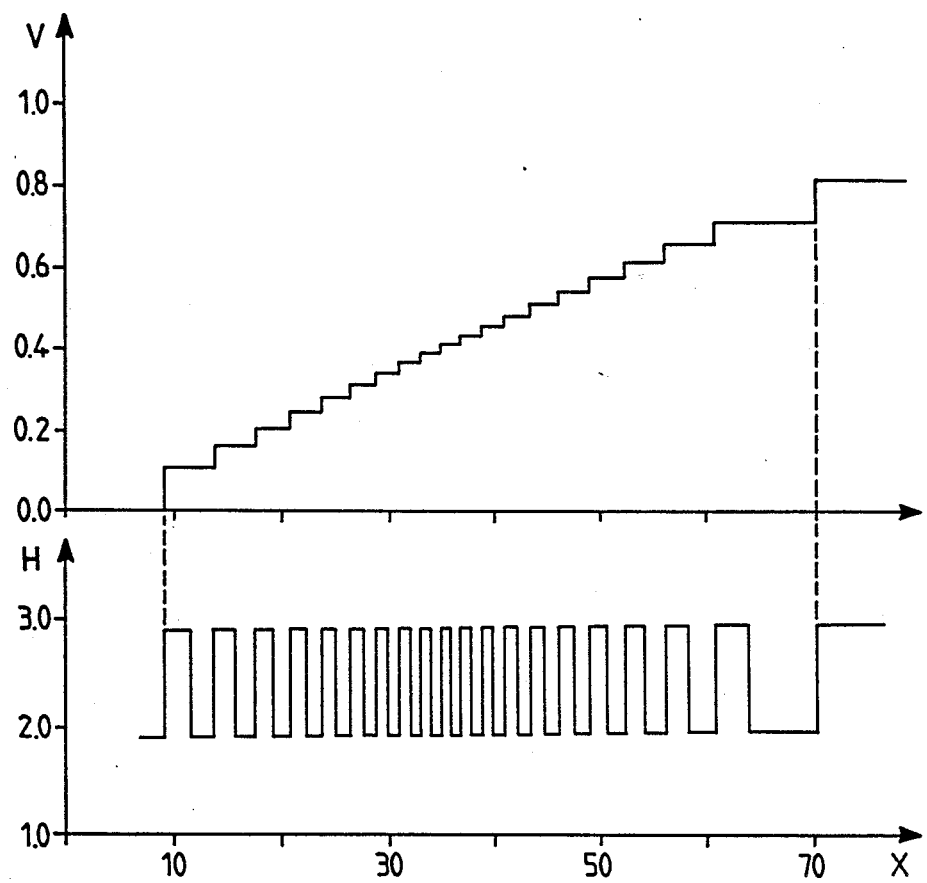

FIG. 5D shows a read clock which, according to the invention, allows the recovery of a rectilinear shape of the stepped output slope. But these steps are now obtained with shorter read periods in the centre and longer read periods at the ends of the slope. The resolution of the image is increased in the centre.

When as is shown in FIG. 2D, the anamorphic lens produces a uniform distortion in one or several portions of the image, the read clock is then not continuously variable but is formed of durations during which the clock periods remain stable. In these two cases, the values are programmed in the digital memory.

When the determination of a field having central periods differing from the lateral periods is involved, the programming will not cause any problem. When the read clock rate must respect a predetermined law, the programming can be effected in the following manner.

Figure 6:
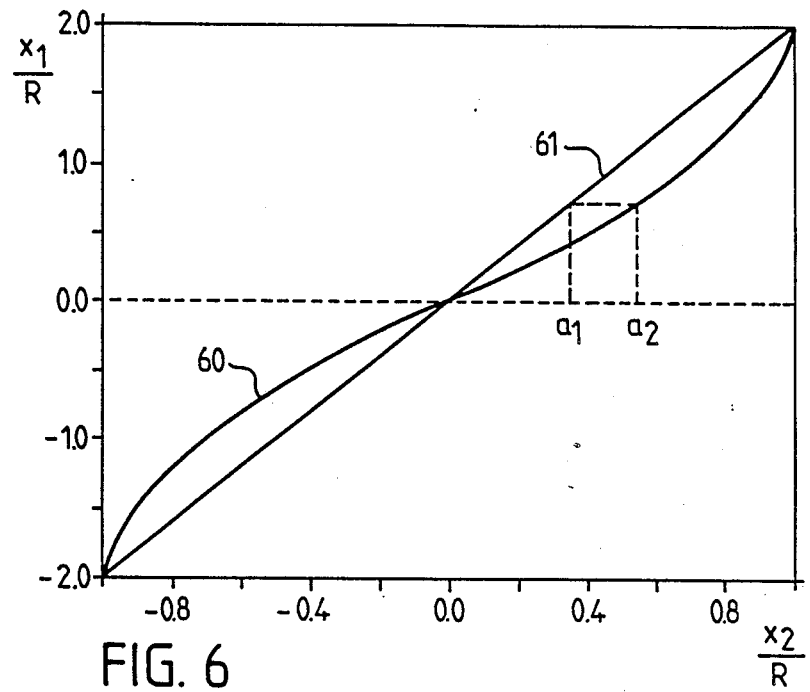
FIG. 6 shows a curve of an anamorphic lens.

FIG. 6 shows at the curve 60 the abscissa $a_2$ of a point of impact in the direction of the distortion on the face of the CTD in the presence of an anamorphic lens. This Figure is similar to the FIG. 3A with differently graded axes. If the lens does not distort, this abscissa will be $a_1$ (curve 61). These two abscissas are interrelated by $a_1 = g(a_2)$ wherein the function $g(a)$ is the anamorphic law but for a constant multiplier.

Now the assembly of n image elements of any line of the CTD positioned on the abscissa p, 2p, 3p ... np (p being the step), respectively, will be considered. In the case of a constant read period To which represents the standard situation, the instant at which the signal of the image element number i appears at the ouptu will be ti, equal to the sum of i periods To. With the anamorphic lens the period To is replaced by variable periods Ti. To determine the assembly of Ti, an image element of the abscissa $a_2$ will be considered and let t be the instant at which this element is read. If the image was not distorted, this image element would appear at $a_1$, Consequently $t = (a_1/P) \cdot To$ or $t = g(a_2) \cdot To/P$ or for an image element of the order i positioned in i.p., we have $ti = g(ip) \cdot To/P$.

Between two consecutive read operations of two image elements i and $(i-1)$ the period Ti is:

$Ti = (g(i \cdot p) - g((i-1)p)) To/P$.

Figure 7:
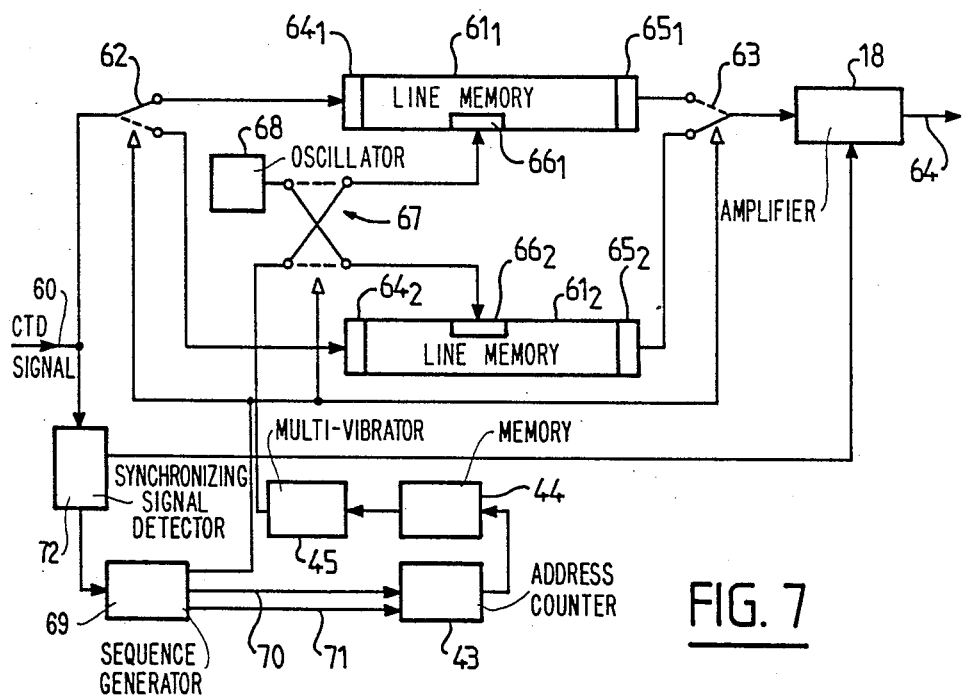
FIG. 7 is a diagram of the connection of the charge-transfer device via a transmission line to the display device, two line memories being interposed which alternately operate in the read and in the write mode and suppress the distortion of the image.

In accordance with a further embodiment, it is equally possible not to effect reading with a variable rate of the output register of CTD. Actually, this lower period reading operation increases the bandwidth of the signal to be transmitted and requires a wider passband. This may, depending on the transmission mode utilized, have disadvantages. In that case reading of the output register of the CTD is effected at a constant rate and the modulated reading operation is effected at the other end of the transmission line. Then the arrangement shown in FIG. 7 is used. The video signal supplied by the CTD arrives on a connection 60. It is alternately distributed over two line memories $61_1$ and $61_2$ with the aid of a change-over switch 62. Their outputs are alternately read by means of a change-over switch 63 and are applied from the output 64 to on display device via the output amplifier 18. Each line memory comprises an input amplifier $64_1$, $64_2$, an output amplifier $65_1$, $65_2$, and a clock control generator $66_1$, $66_2$. These control generators $66_1$, $66_2$ alternately receive clock pulses via a change-over switch 67. A clock signal having a constant period is supplied by a local oscillator 68. It is used to load alternately each line memory using the data which arrive at the input 60. A further variable-rate clock signal is supplied by a programmable multivibrator 45 which is controlled by a memory 44 which receives its addresses from an address counter 43. A sequence generator 69 causes the address counter 43 to function (connecting line 70) and resets it to zero (line 71). This sequence generator 69 also acts on the change-over switches 62, 63 and 67 to provide that one line memory is in the constant-rate write phase whilst the other line memory is in the variable-rate read phase. The synchronizing signals existing in the composite video signal present at the input 60 are detected by the synchronizing signal detector 72 and have for their object to act on the sequence generator 69 and are also applied again to the output amplifier 18 at the end of the processing operation.

The line memory may be an analog shift register or a digital shift register provided at the input of an analog-to-digital converter and at the output of a digital-to-analog converter.

What is claimed is:

1. A television camera for picking up a scene and for producing a signal for displaying an image therefrom, a portion of which has an increased resolution, characterized in that the camera is provided at its input with a lens which produces an image of the scene on an input face of an anamorphic lens which distorts the image in accordance with a predetermined law in a given direction, the lens cooperating with a charge-transfer pick-up device comprising means for electronically compensating for the distortion produced by the anamorphic lens.

2. A camera as claimed in claim 1, characterized in that the anamorphic lens supplies an image which is progressively distorted into one direction in a certain portion of the image.

3. A camera as claimed in claim 1, characterized in that the anamorphic lens supplies an image which is uniformly distorted into one direction in a certain portion of the image.

4. A camera as claimed in claim 1, characterized in that the anamorphic lens supplies an image which is distorted in its lateral portions, the central portion not being modified.

5. A camera as claimed in claim 1, characterized in that the anamorphic lens comprises a main fibre optics image conductor, having a non-flat input face, united via a portion of its input face with the overall extent of an output face of at least one appendant fibre optics image conductor in the form of a chamfer, the other portion of the input face of the main conductor and the input face of the appendant conductor being located in the image plane of the input lens, the axes of the optical fibres of the two conductors not being parallel to each other, the output face of the anamorphic lens being the output face of the main image conductor.

6. A camera as claimed in claim 1, characterized in that the image obtained on the output face of the anamorphic lens is located in the object face of a coupling lens for coupling to the pick-up device.

7. A camera as claimed in claim 5, characterized in that the anamorphic lens is fixed on the pick-up device by means of its output face.

8. A camera as claimed in claim 1, characterized in that the charge-transfer pick-up device detects the supplied distorted image, and includes an output shift register which is read by means of a clock whose rate is programmed as a function of the predetermined law, so that the signal supplied by the charge-transfer device renders it possible to recover a final image which is no longer distorted and has a different resolution in different portions of the image.

9. A camera as claimed in claim 8, characterized in that the charge-transfer pick-up device is a bidimensional device which is organized in lines and colums and receives the distorted image such that the distortion is present in a direction which is substantially parallel to the line direction.

10. A camera as claimed in claim 9, characterized in that the read clock of the output shift register has a shorter period of extract the data corresponding to the high-resolution portion than for the extraction of the data corresponding to the other portions.

11. A camera as claimed in claim 8, characterized in that the read clock is obtained from a clock generator acting on an address counter, which has for its object to read a digital memory storing data which control a programmable multivibrator which supplies the read clock according to said data relating to the predetermined law.

12. A camera as claimed in claim 9, characterized in that the output shift register is read with the aid of a clock having a uniform rate, the output data being transmitted via a transmission channel to two external line memories, one of which is written at a uniform rate whilst the other memory is read at a programmed rate, as a function of the predetermined law, each line memory being alternately switched to the read mode and to the write mode at each television line slyback pulse.

* * * * *